US008451827B2

(12) United States Patent
Vogel

(10) Patent No.: US 8,451,827 B2
(45) Date of Patent: *May 28, 2013

(54) TIME-SLOT INTERCHANGE CIRCUIT

(75) Inventor: Danny C. Vogel, Sudbury, MA (US)

(73) Assignee: LSI Corporation, San Jose, CA (US)

( * ) Notice: Subject to any disclaimer, the term of this patent is extended or adjusted under 35 U.S.C. 154(b) by 650 days.

This patent is subject to a terminal disclaimer.

(21) Appl. No.: 12/609,150

(22) Filed: Oct. 30, 2009

(65) Prior Publication Data

US 2010/0046508 A1   Feb. 25, 2010

Related U.S. Application Data

(62) Division of application No. 12/014,162, filed on Jan. 15, 2008, now Pat. No. 7,633,936, which is a division of application No. 09/919,221, filed on Jul. 31, 2001, now Pat. No. 7,346,048.

(51) Int. Cl.
*H04L 12/66* (2006.01)

(52) U.S. Cl.
USPC .......................................................... 370/352

(58) Field of Classification Search
None
See application file for complete search history.

(56) References Cited

U.S. PATENT DOCUMENTS

| 4,330,886 | A | * | 5/1982 | Fukuda et al. | 370/271 |
|---|---|---|---|---|---|
| 4,893,310 | A | | 1/1990 | Robertson et al. | |
| 5,144,624 | A | * | 9/1992 | Sharper et al. | 370/384 |
| 5,497,373 | A | | 3/1996 | Hulen et al. | |
| 5,502,838 | A | | 3/1996 | Kikinis | |
| 5,581,790 | A | | 12/1996 | Sefidvash | |
| 5,742,781 | A | | 4/1998 | Bajwa | |
| 5,928,365 | A | | 7/1999 | Yoshida | |
| 5,940,409 | A | | 8/1999 | Bergin | |
| 5,991,385 | A | * | 11/1999 | Dunn et al. | 379/202.01 |
| 5,999,529 | A | | 12/1999 | Bernstein et al. | |
| 6,049,540 | A | | 4/2000 | Chrin et al. | |
| 6,057,791 | A | | 5/2000 | Knapp | |
| 6,073,244 | A | | 6/2000 | Iwazaki | |
| 6,101,198 | A | | 8/2000 | Koenig et al. | 370/535 |
| 6,115,395 | A | | 9/2000 | Norrell et al. | |
| 6,134,668 | A | | 10/2000 | Sheikh et al. | |
| 6,425,086 | B1 | | 7/2002 | Clark et al. | |
| 6,785,261 | B1 | | 8/2004 | Schuster et al. | |
| 6,786,006 | B2 | | 9/2004 | Kowalczyk et al. | |
| 6,879,603 | B1 | | 4/2005 | Koenig et al. | 370/535 |
| 6,888,825 | B1 | | 5/2005 | Liu | |
| 6,895,016 | B1 | * | 5/2005 | Nguyen et al. | 370/437 |
| 6,944,153 | B1 | | 9/2005 | Buckland et al. | 370/376 |
| 2002/0141395 | A1 | * | 10/2002 | Chang | 370/355 |

OTHER PUBLICATIONS

IBM Technical Disclosure Bulletin, "Multiple Digital Signal Processor Multimedia Subsystem with Shared Memory", vol. 36, No. 10, Oct. 1993, pp. 371-372.

* cited by examiner

*Primary Examiner* — Yong Zhou
(74) *Attorney, Agent, or Firm* — Christopher P. Maiorana, PC

(57) ABSTRACT

A circuit and method are presented for signal processing and routing of digital voice telephony signals, using a specialized high-density integrated circuit voice processor. The voice processor performs several essential functions required for telephony processing, including echo cancellation, protocol conversion, and dynamic range compression/expansion. These functions are traditionally performed by multiple circuits or modules. By combining these capabilities in a single device, power and circuit board area requirements are reduced. The embodiment of the circuit and method disclosed herein include novel implementations of a time-slot interchange circuit and a telephony signaling circuit. Both of these circuits are designed to minimize demands on the signal processing engines incorporated within the voice processor, and account for very little of the on-chip circuitry.

16 Claims, 5 Drawing Sheets

TIME-SLOT INTERCHANGE CIRCUIT

This is a divisional of U.S. Ser. No. 12/014,162, filed Jan. 15, 2008, now U.S. Pat. No. 7,633,936, which is a divisional of U.S. Ser. No. 09/919,221, filed Jul. 31, 2001, now U.S. Pat. No. 7,346,048, both of which are hereby incorporated by reference in their entirety.

FIELD OF THE INVENTION

This invention relates to integrated circuits (ICs) for voice communications, and more particularly, to a highly integrated processor for processing and routing voice traffic over a digital network. The processor disclosed herein efficiently incorporates several signal processing and formatting operations traditionally using multiple discrete devices, enabling substantial savings in space and power consumption.

BACKGROUND OF THE INVENTION

Early voice communications was based on the transmission of analog signals over comparatively short distances. However, the telephone soon became an indispensable part of modern life, for both personal and commercial use. As the amount of voice traffic grew and the use of long distance connections became greater, it became necessary to adopt a fundamentally different method of transmitting voice signals. The reason for this is simple. A communications network in which every 2-way conversation is allotted its own line works well enough for a small number of users, separated by short distances. But if the number of users increases by a factor of 10, the telephone company must install 10 times as much wire into the network. And, if many of these conversations occur between users at remote locations, the amount of wire can become very large. In fact, the material and labor demanded quickly becomes prohibitive.

A simple example illustrating the technique of time division multiplexing (TDM) is presented in FIG. 1. In this example, four different voice signals from sources A-D are to be transmitted across a single wire to a remote destination. In the first stage 24 of this process, the voice signals are digitized by analog-to-digital (A/D) converters 10A-D. In other words, each of the continuous signals A-D is periodically sampled and represented by a binary number denoting the approximate voltage of the sample. In FIG. 1, the samples for waveform A are represented by solid circles, while those for waveforms B, C and D are represented by hollow circles, hollow squares and solid squares, respectively. The individual samples in each sequence may be denoted by the letter associated with the source, with a subscript for the sample number. For example, the samples in the sequence derived from source B would be denoted $B_0, B_1 \ldots B_n$.

The resulting sample sequences 26 must contain sufficient information to reconstruct the original waveforms at the destination. According to the Nyquist Theorem, this requires that each waveform be sampled at a rate greater than twice the highest frequency present in the waveform. For example, a signal containing frequencies of up to 1 KHz must be sampled at a rate greater than 2 KHz, to permit the signal to be reconstructed from its discrete samples. In the case of standard voice communications, signals are assumed to be band-limited to about 3 KHz, so a sampling rate of 8 KHz is often used. This implies that the sample interval (i.e., the time interval between any two adjacent samples) in the sequences 26 can be 125 µs.

A multiplexer 12 combines the four sample sequences 26 into a multiplexed sequence 28. Two characteristics of this multiplexed sequence are particularly noteworthy. First, the original four sample sequences are interleaved to create the multiplexed sequence. Thus, the sample order in the multiplexed sequence is:

$$A_0, B_0, C_0, D_0, A_1, B_1, C_1, D_1, \ldots A_n, B_n, C_n, D_n$$

Note that this preserves the original order of the samples. Second, the effective sample rate in the multiplexed sequence is four times that of the original sequences. Within each 125 µs sample interval, the multiplexer 12 must collect a new sample from each of the four sources and transmit all four samples. Consequently, the samples in the multiplexed sequence 28 can be separated by 31.25 µs, for an effective sample rate of 32 KHz.

The multiplexed sample sequence 28 is typically buffered by a high-speed amplifier, which drives the impedance of the wire, cable, transmission line 16, etc. used to convey the sequence to the desired remote destination. At the destination, another amplifier receives the signal from the transmission line 16 and conditions (filtering, glitch suppression, etc.) it before presenting it to the input of a de-multiplexer 20. The de-multiplexer 20 reverses the operations performed by multiplexer 12, to extract the original four sample sequences 26 from the multiplexed sequence 28. Each of the resulting sample sequences may then be acted upon by a digital-to-analog (D/A) converter 22A-D to reconstruct the respective voice signals 30.

In the preceding example, only four signals were multiplexed. However, the TDM principle can clearly be extended to transmit greater numbers of voice signals over a single line. In fact, the upper limit on the number of voice channels that can be carried is related to the amount of available bandwidth, commonly stated in terms of the maximum bits per second (bps) sustainable by the hardware. Along with the number of signal sources (or, channels) and the sample rate, the bandwidth required for a TDM transmission depends on the number of bits per sample. For voice communications, signals are usually digitized to 8 bits. Thus, the bandwidth required can be expressed as: bandwidth (bps)=no. of channels×no. of bits per sample×sample rate. The original T-carrier system developed in the 1970's allows for 24 voice channels to be multiplexed onto a single line, using the techniques described above. If each channel is sampled with 8-bit resolution at a rate of 8 KHz, the TDM bandwidth required is: 24×8×8000=1.536 Mbps. The original T1 standard defines a data structure known as a D4 frame for the transport of TDM data. A D4 frame consists of 24 consecutive 8-bit samples (one from each voice channel), preceded by a framing bit. Note that the addition of the framing bit alters the previous TDM bandwidth calculation. Since each frame consists of 24×8+1=193 bits, and frames are transmitted at 8000 frames per second, the bandwidth becomes: (24×8+1)×8000=1.544 Mbps. The framing bit follows a special pattern called the frame alignment signal, which repeats every 12 frames. The group of 12 consecutive frames bounded by this frame alignment signal is known as a superframe.

T1 performance is easily achieved with today's technology, and the demand for greater bandwidth soon led to the introduction of other standards, embodied in the following digital signal hierarchy (DSH):

| DS Level | North American Bandwidth | Voice Channels | T-Carrier |
| --- | --- | --- | --- |
| DS0 | 64 Kbps | 1 | |
| DS1 | 1.544 Mbps | 24 | T1 |

-continued

| DS Level | North American Bandwidth | Voice Channels | T-Carrier |
|---|---|---|---|
| DS2 | 6.312 Mbps | 96 | |
| DS3 | 44.73 Mbps | 672 | T-3 |

Thus, for example, a single T-3 line supports 672 DS0 voice channels.

Since data in a frame is multiplexed, it is possible to reroute data by rearranging the time slots between incoming and outgoing channels. This is accomplished by a device known as a time-slot interchanger (TSI). FIG. 2 illustrates the operation of a TSI. As described above, a multiplexer 100 collects one sample from each of 24 incoming voice channels, at a sample rate of 8 KHz. These samples are placed in a memory buffer 102; their location in the buffer is based on the channel from which they originated. The TSI 104 rearranges the order of the samples and places the re-ordered samples in an outgoing buffer 106 (while another incoming frame is being entered into the first buffer 102). A de-multiplexer 108 then scans the outgoing buffer and assigns the samples to voice channels in a different sequence. A significant amount of memory is required for the TSI to re-sequence the time slots. If two entire frames of data must be buffered, a total of 384 bits of memory is needed. Furthermore, complex support circuitry is necessary to control the flow of data. Since both the memory and ancillary circuitry must operate at relatively high speeds, TSI modules can be costly, especially as channel capacities increase beyond T1 rates through the TSI.

In addition to voice data, line status information may be sent over a telephone connection. Voice band signaling is a method of placing line status bits within the voice data. In the simple case, two bits are included in a sixth frame of a D4 superframe on a T1 connection to indicate the on-hook/off-hook status of a call. The so-called A-bit and B-bit used for this purpose are inserted in the least significant bit of each of the 24 time slots in the $6^{th}$ and $12^{th}$ frames, respectively, of the superframe. Since the signaling bits overwrite voice data, this technique is referred to as "robbed bit" signaling. An extended superframe (ESF), consisting of 24 D4 frames, allows the addition of a C-bit (in the $18^{th}$ frame) and D-bit (in the $24^{th}$ frame). Alternatively, the line status information can be sent on a separate connection, by a technique known as "clear channel" signaling.

As described above, voice signals are typically encoded using time division multiplexing (TDM) for transmission over the telephone network. However, there is an undesirable characteristic of TDM, which potentially reduces its efficiency. Under TDM, the mapping of time slots to voice channels within a frame is fixed. Consequently, a time slot allotted for a particular voice channel may go unused, if the signal source for that channel is inactive during its time slot. This typically occurs with "bursty" signals, which consist of active signal intervals separated by periods of inactivity. Significantly, normal speech is a bursty signal. With such signals, the frame may be transmitted with less than its full capacity, since many of its timeslots may contain samples collected during a period of inactivity. An approach that overcomes this limitation is asynchronous transfer mode (ATM). Asynchronous transfer mode (ATM) is a switching technology that can organize digital data into 53-byte cells for transmission over a physical medium. Each cell may consist of one 5-byte header and a 48-byte payload, containing the actual data to be transmitted. Individually, a cell is processed asynchronously relative to other related cells and is queued before being multiplexed over the transmission path. ATM presents the cells (containing the voice samples) to the network whenever there is enough bandwidth available to handle them. In this sense, the voice data transfer is asynchronous relative to the generation of the original voice signal. In addition to voice, ATM supports various other types of signals and data, including video and multimedia applications. In an ATM network, data must be divided into cells before transmission and reconstituted from cells upon reception. This is known as segmentation and reassembly (SAR), and is typically handled by a hardware device (i.e., electronic circuitry).

A T1 connection can directly route frames from a source to designated destination. In contrast, ATM allows flexibility in the choice of a connection path. The 5-byte header within each 53-byte ATM cell contains a virtual path identifier (VPI) and virtual channel identifier (VCI). The VPI and VCI are used to route the cell to its intended destination. This allows the ATM switching hardware to efficiently allocate connection paths based on the level of activity in the voice channels. Because the cells are always the same size, dedicated hardware designs for high-performance ATM switches are relatively straightforward. As a result, ATM networks can operate at speeds greater than 155 Mbps.

Voice data formatted as ATM cells can be transmitted over a T1 connection by using a network adaptor. The network adaptor converts the 53-byte ATM cells into a sequence of samples, which are assigned to the timeslots within three frames (since each frame contains 24 bytes of data, the 53 cells must be spread over three frames). This process can also be reversed to generate ATM cells from T1 frames. The conversion between ATM and T1 data formats can be employed to efficiently route voice traffic through the telephone network.

Within the telephone system network, a central office (CO) is an office local to a group of subscribers (i.e., telephone system users). Home and business lines are connected to a CO by what is called a local loop. The local loop connection is usually on a pair of copper wires called twisted pair. The voice signals from each subscriber are typically in analog form (i.e., continuous) over the local loop, but are transformed into digital data at the CO. The CO also has switching equipment that can switch calls locally or to long-distance carrier phone offices. The conversion from T1 to ATM is useful for combining a large number of voice channels to be transmitted over a long distance by a high-bandwidth link (such as optical fiber) connecting one central office to another within the telephone network.

Normal voice communications is connection-oriented. That is, a connection between the talker and the listener must be established before voice data is transmitted. In contrast, data communication networks, such as the Internet, or a local area network (LAN) in an office, are inherently connectionless. The model for such networks is that of a single communications line, shared by several nodes. Connectionless network service does not predetermine the path from the source to the destination system. Messages are sent out on the shared line in the form of packets (also known as datagrams). Each packet is directed to a particular node through the inclusion of the recipient's address in header information associated with the message. Packets must be completely addressed because different paths through the network might be selected (by routers) for different packets, based on a variety of influences. Each packet is transmitted independently by the source system and is handled independently by intermediate network devices. The connectionless mode of operation is more appropriate for many types of data communication. For example, when sending an email message out over the Internet, it would be inconvenient to require the intended recipient of the email to have previously established a connection channel through which to receive the email.

Voice data may be formatted to allow transmission over a connectionless network by segmenting the data into appropriate-sized frames, prefixed with the required header information. This conversion is termed data encapsulation. Data encapsulation could be necessary, for example, at the interface between the public switched telephone network (PSTN) and an optical fiber-based LAN. The Transmission Control Protocol/Internet Protocol (TCP/IP) suite, described below, may be used for the encapsulation and delivery of voice data over a connectionless network. The function of the various protocols in the TCP/IP suite may be understood with reference to the following open systems interconnect (OSI) 7-layer model.

| (7) APPLICATION LAYER | (6) PRESENTATION LAYER | (5) SESSION LAYER | (4) TRANSPORT LAYER | (3) NETWORK LAYER | (2) DATA LINK LAYER | (1) PHYSICAL LAYER |
|---|---|---|---|---|---|---|
| Email | HTTP | POP3 | TCP | IP | Ethernet | ADSL |
| File Transfer | FTP | IMAP | UDP | ATM | SLIP | Coaxial Cable |
| Web Applications | Telnet | | | | MAC | |
| RTP | | | | | | |

In the OSI model, the process or communication between two computers connected by a telecommunication network is divided into layers. When a message is transmitted from one computer to the other it passes down through the various layers on the sender's side of the network, and back up through the protocol layers when it is received at the receiver's side.

(1) The Physical Layer is the lowest level of the OSI model, and the protocols here define actual physical medium for the transport of a bit stream from one point in the network to another.

(2) The Data-Link Layer defines the access strategy for the physical medium, and pertains to hardware devices such as network interface cards (NICs), routers and bridges.

(3) The Network Layer governs the routing and forwarding of data through the network.

(4) The Transport Layer provides error-checking and ensures that all the data sent have been received at the destination.

(5) The Session Layer coordinates exchanges between two computers over the network to ensure that the connection is preserved until the transaction is completed.

(6) The Presentation Layer, usually part of an operating system, is the point at which data sent is rendered into a format usable by the recipient—e.g., transformation of a byte stream into a displayable image.

(7) The Application Layer is the layer at which network-oriented applications programs reside—these applications are the ultimate target of the message transmitted by the sender.

The IP is a Layer 3 protocol, most familiar as the protocol by which data is sent from one computer to another on the Internet. Each computer (known as a host) on the Internet has at least one IP address that uniquely identifies it from all other computers on the Internet. When data is sent or received (for example, an e-mail note or a Web page), the message gets divided into packets, each of which contains both the sender's and the receiver's Internet address. Packets are first sent to a gateway computer that directly accesses a small neighborhood of Internet addresses. If the destination address is not directly accessible to the gateway computer, it forwards the packet to an adjacent gateway. This process continues until one gateway recognizes the packet as belonging to a computer within its immediate neighborhood or domain. That gateway then delivers the packet directly to the computer whose Internet address is specified.

IP is a connectionless protocol, which means that there is no continuing connection between the end points that are communicating. Each packet that travels through the Internet is treated as an independent unit of data without any relation to any other unit of data. Consequently, the packets comprising a message may take different routes across the Internet. Furthermore, packets can arrive in a different order than that in which they were sent. The IP accounts for their delivery to the correct recipient, but does not manage the delivery sequence. In the context of the Internet, the Layer 4 Transmission Control Protocol (TCP) is generally relied upon to arrange the packets in the right order, and the two protocols are often jointly referred to as TCP/IP. An alternative to TCP (also at Layer 4) is the User Datagram Protocol (UDP), which offers a limited amount of service when messages are exchanged between computers in an IP-based network. Like TCP, UDP uses the IP to actually get a packet from one computer to another. Unlike TCP, however, UDP does not provide the service of dividing a message into packets and reassembling it at the other end. However, UDP does provide port numbers to help distinguish different user requests and, optionally, checksum capability to verify that the data arrived intact. UDP is used by applications that do not require the level of service of TCP or that wish to use communications services not available from TCP.

Realtime transport protocol (RTP) is an IP-based protocol providing support for the transport of real-time data such as video and audio streams. A Layer 4 protocol, RTP provides time-stamping, sequence numbering and other mechanisms related to managing timing issues in such data. The sender creates a timestamp when the first voice signal sample in a packet is collected, and this timestamp is then attached to the data packet before sending it out. The receiver may use this information to assemble the packets in their correct sequence, or to synchronize one packetized data stream with another—for example, in the case of transmitted audio and video data from a movie. RTP also provides other services, such as source identification. Using the source identifier in the RTP header of an audio packet exchanged during a video conference, for example, a user can identify who is speaking.

Information required by each protocol is contained in a header attached to a data packet as it makes its way through the network. Header information associated with the proto cols at different OSI layers can be nested. For example, data sent from an application may begin as an RTP packet:

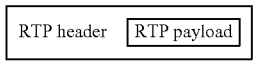

As the packet moves down through the OSI layers to be transmitted over the physical medium, a UDP header is prepended, followed by an IP header:

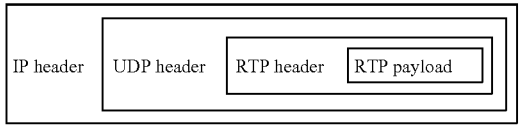

It is often necessary to transform voice from the connection-oriented frame-based TDM format used by the PSTN to a connectionless cell-based format, such as that used by ATM, or a packetized format such as used by an Ethernet network. A significant effort in such transformations is devoted to the preparation and attachment of header information to the data.

In addition to the various formatting operations described above, which are required to prepare voice data for transmission over the telephone system or a network, there is considerable signal processing involved in voice communications.

To reduce the amount of bandwidth required for their transmission over the telephone network, the dynamic range of voice signals is generally reduced, using one of various standard compression algorithms. At the receiving end, the original dynamic range of the signal is restored by a complementary expansion algorithm. The dynamic range of an audio signal is the difference between the loudest part of the signal and the quietest part. When an analog signal is translated into digital samples (a process known as quantizing, or digitizing the analog signal), the continuous range of values comprising the signal are approximated by a finite set of discrete values. The resolution of the sampling process refers to the number of discrete values used in this approximation, and the discrete value closest to the actual value of the analog signal is always used to approximate the signal. For example, assume that an analog signal always has a value $V_S$ within the range of 0.0-4.0 Volts, and that 4 equally-spaced discrete values (0.5, 1.5, 2.5 and 3.5) are used to represent the signal. The following chart illustrates how the closely the discrete values approximate the analog signal:

| ACTUAL ANALOG VOLTAGE | DISCRETE VALUE APPROXIMATION |
| --- | --- |
| $0 \leq V_s < 1.0$ Volts | 0.5 Volts |
| $1.0 \leq V_s < 2.0$ Volts | 1.5 Volts |
| $2.0 \leq V_s < 3.0$ Volts | 2.5 Volts |
| $3.0 \leq V_s < 4.0$ Volts | 3.5 Volts |

The worst-case error with this approximation is ±0.5 Volts, which is equivalent to 12.5% of the full dynamic range of the signal. However, if the same dynamic range is divided into a larger number of discrete values, the accuracy of the approximation can be greatly improved. For example, the following chart illustrates the improvement in worst-case error if 256 discrete values are used instead of 4:

| ACTUAL ANALOG VOLTAGE | DISCRETE VALUE APPROXIMATION |
| --- | --- |
| $0 \leq V_s < 0.015625$ Volts | 0.078125 Volts |
| $0.015625 \leq V_s < 0.03125$ Volts | 0.0234375 Volts |
| . | . |
| . | . |
| . | . |
| $3.984375 \leq V_s < 4.0$ Volts | 3.9921875 Volts |

In this case, the worst-case error becomes ±0.015625 Volts. Thus, using a large number of distinct values results in a more accurate approximation. However, it also requires that more bits be used to represent each sample. By reducing the dynamic range, fewer bits can be used to obtain a given worst-case error. Uncompressed audio requires 16-bit resolution. At a sampling rate of 8 KHz this results in a required bandwidth of 128 Kbps. By compressing the dynamic range so that 8-bit samples can be used, the bandwidth requirement is only 64 Kbps.

Dynamic range compression results in a loss of information. That is to say, a signal that has been compressed and restored will not exactly match the original signal. However, the standard compression algorithms for voice communications are designed so that these losses are not noticeable. Two of the more widely used compression techniques are the μ-law and adaptive differential pulse code modulation (ADPCM) compression algorithms. μ-law compression is based on sampling a logarithm of the analog signal, rather than the signal itself. The logarithm has a narrower range of values than the raw signal. For example, if the voltage of the uncompressed voice signal has a maximum value of 10.0, its base-10 logarithm has a maximum value of only 1.0. Routines exist for highly efficient calculation of logarithms by digital logic (e.g., a computer or dedicated signal processor). Advantageously, the original signal can be recovered from the logarithm by computing the complementary antilogarithm.

ADPCM is an enhanced form of differential pulse code modulation (DPCM). Instead of quantizing the signal itself, DPCM quantizes the difference between successive samples of the signal—hence the use of the term "differential". ADPCM, is an adaptive version of this technique, in which the assumptions based on the previous quantized sample are used to restrict the presumed range of values for the next sample. This algorithm uses only 4 bits to represent each sample of a voice signal.

In addition to compression, voice signals over the telephone network may also require echo cancellation. Echoes result from the reflection of electrical signals (usually arising from mismatched impedances) back to the sender from the receiving end of the line. The severity of the echo is related to the transit time for the signal to travel from the sender to the receiver, which in turn depends on the electrical path length between sender and receiver. If the distance is short, the echo returns so quickly that it is not perceptible. On the other hand, if the path length is sufficient to create a delay in the echo on the order of 10 ms or more, the effect can be disruptive to normal telephone conversations. In fact, the "threshold of annoyance" for echo is also related to the loudness of the echo in relation to the primary voice signal. Consequently, even if echo cannot be completely eliminated, by reducing its amplitude sufficiently it can be rendered unobtrusive.

Echo canceling algorithms are typically implemented using a digital signal processor (DSP), which is a high-speed microprocessor specially adapted for numeric computation. Such algorithms are typically adaptive—that is, they are able to quickly "learn" the transmit/receive characteristics of the line during the first few seconds after a connection is made, and also respond to any changes in those characteristics while the line is active. Over the course of a conversation, the DSP monitors the digitized voice signals being transmitted and predicts the corresponding echo signal. The predicted echo is simply subtracted from the actual return signal.

The various switching, formatting and signal processing operations performed on voice data have necessitated the use of extensive electronic circuitry in the central offices and other nodes within the telephone network. Furthermore, because of their specialized nature, these operations are generally handled independently by discrete rack-mount circuit cards and modules. Unfortunately, this has led to a proliferation of electronic devices to deal with large numbers of incoming and outgoing lines. The consumption of power and space attributable to these devices is a serious problem. Excessive heat generation and its impact on system reliability, are a further concern.

In view of these problems, it would be desirable to have a single device integrating many of the functions described above. The device should support compression and echo canceling signal processing functions. It should also be capable of segmenting data and providing headers to allow translation of frame-based and/or cell-based data formats, such as RTP packets or ATM cells. In addition, the device should be able to perform time slot interchange on incoming and outgoing TDM data, and should allow detection of both voice band and clear channel signaling. Furthermore, the device power consumption should be low, to mitigate heat dissipation problems associated with multi-device installations.

SUMMARY OF THE INVENTION

The problems outlined above are addressed by a specialized high-density integrated circuit for signal processing and routing of digital voice telephony signals. In addition to standard signal processing functions, such as dynamic range compression/expansion and echo canceling, the improved voice processor supports the conversion between cell-based or packet-based data and traditional frame-based telephony data. The voice processor also employs an efficient DMA-based protocol stack and independent processor for the creation and management of cell or packet headers, as well as an independent CRC/Checksum engine. Thus, protocol processing and error detection have minimal impact on concurrent signal processing operations.

A time-slot interchange circuit within the voice processor is provided. In an embodiment, this TSI employs a small memory buffer with a storage location for each of multiple data streams. Short bit sequences from incoming time division multiplexed (TDM) data streams may be stored in these locations before they are placed into outgoing streams. Time slot interchange is accomplished by switching circuitry, which redirects bits occupying a given TDM time slot in an incoming data stream to an outgoing stream other than the one corresponding to the input stream. This effectively replaces the bit sequence originally occupying the time slot in the 'target' data stream. Advantageously, this technique does not require buffering entire incoming and outgoing frames.

A TSI method is also disclosed, for rearranging time slots in TDM frames arriving as multiple input data streams before transmitting the data as output data streams. The method calls for using a memory buffer to store a short incoming bit sequence from an incoming data stream, and then placing the bit sequence in the same relative position (i.e., time slot) in any output data stream or streams.

A telephony signaling circuit is within the voice processor disclosed herein. Using the telephony signaling circuit, the processor is able to respond to changes in line status indicated by signal bits. The processor can also effect changes in line status by altering the signal bits. The telephony signaling circuit contains a comparison register for each of the incoming TDM lines, in which the current and previous signal bits are stored. For each comparison register, there is an associated data comparator that compares the signal bits previously stored in the comparison register against the current signal bits. If the previous signal bits differ from the current signal bits, the signal bits stored in the comparison register are replaced with the new signal bits, and the associated digital signal processor (DSP) is interrupted, allowing it to respond to the change in line status.

The telephony signaling circuit also contains a modification register and a data modifier for each of the outgoing TDM lines. The modification register stores signal bits received from the DSP. When commanded by the DSP, the data modifier places the signal bits stored within the modification register over the respective outgoing TDM line. The altered signal bits are interpreted by other telephony equipment as a change in the line status. An alternate mode of operation is available in which the packet control processor (PCP) is notified of changes in the line status, rather than the individual DSPs. In this mode, it is also the PCP that alters the line status.

A method for telephony signaling is also provided, according to which current signal bits on incoming TDM lines are stored, along with the previous values of those bits. When a comparison between the current and previous signal bit values indicates that they have changed, a DSP is notified. In addition, the method calls for the DSP placing signal bits and a channel designator in a modification register, and a data modifier using this information to alter the signal bits for the designated outgoing TDM line.

In an embodiment of the voice processor disclosed herein, several essential capabilities for telephony processing are combined in a single device. As compared to conventional solutions, demanding multiple discrete devices, power and circuit board area requirements are reduced. Both the time-slot interchange circuit and telephony signaling circuit are designed to operate independently of the signal processing engines within the voice processor and to occupy very little additional space on the semiconductor substrate.

BRIEF DESCRIPTION OF THE DRAWINGS

Other objects and advantages of the invention will become apparent upon reading the following detailed description and upon reference to the accompanying drawings in which.

Figure 1:
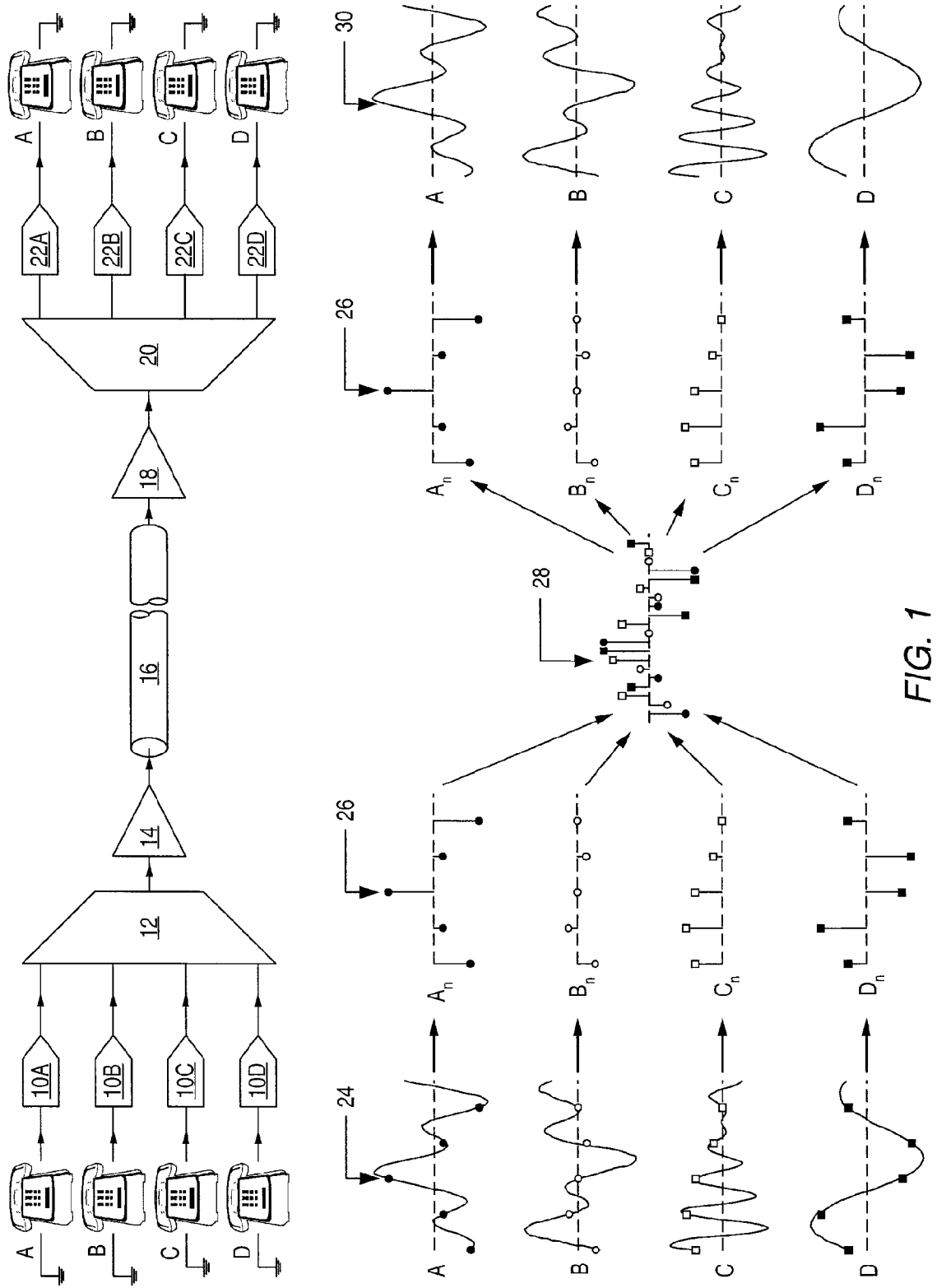
FIG. 1 illustrates the use of time division multiplexing (TDM) to transmit multiple voice channels using a single line.
Figure 2:
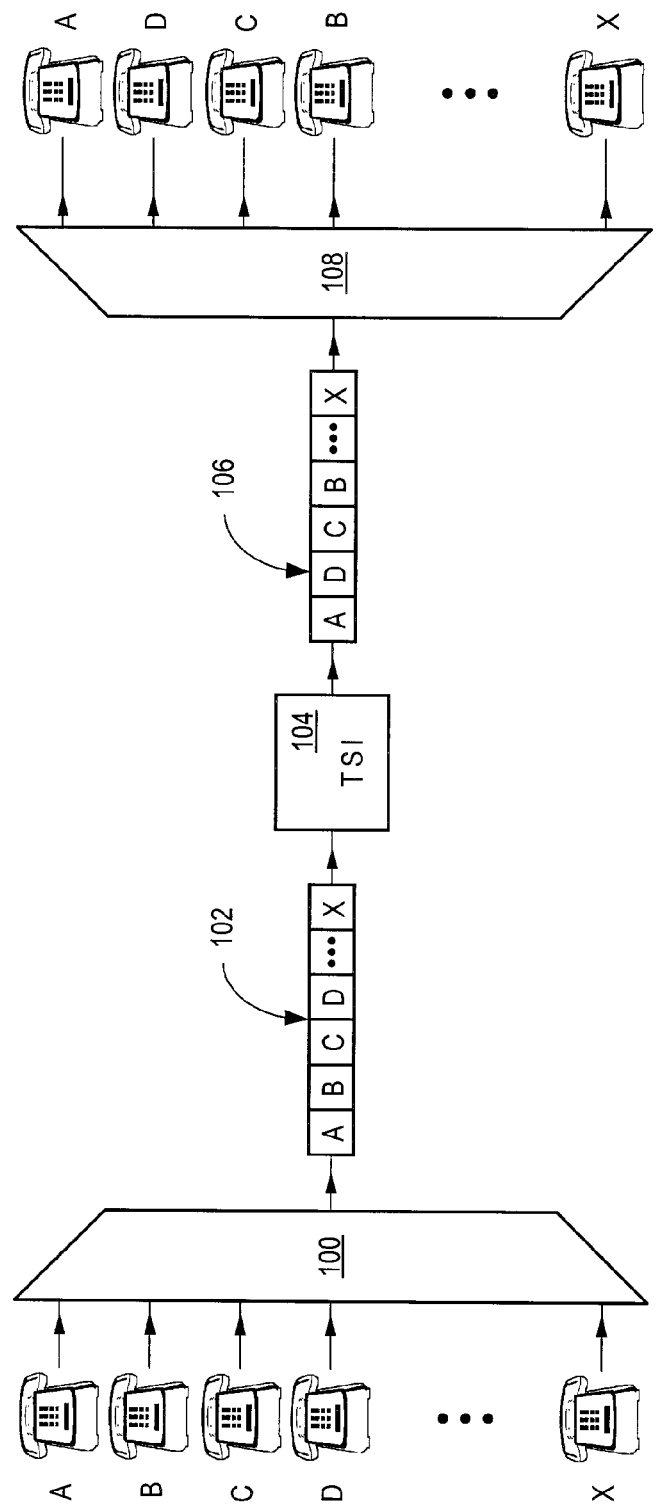
FIG. 2 illustrates the operation of a conventional time slot interchange (TSI) circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Telephone voice signals originate in analog form, but travel relatively short distances before being converted to digital format, for transmission across high-bandwidth networks. To maximize the use of transmission media, such as wire, coaxial cable and fiber optic, multiple digitized voice signals are time division multiplexed (TDM) onto a single line. Throughout the telephone network, gateway sites manage this communications activity, providing signal processing, switching, protocol translation, etc. Given the high volume of voice data traffic, a great deal of circuitry is required to perform these operations. Therefore, the power efficiency and space utilization of the associated circuitry are highly important issues.

A design for a highly-integrated voice processor is presented. The voice processor combines diverse functionality traditionally requiring multiple devices or modules. Furthermore, the voice processor employs novel implementations of some of these functions, allowing its circuitry to be simplified. As a result, the size and power consumption of the voice processor are significantly reduced, relative to conventional discrete approaches. For example, the present embodiment of the voice processor is estimated to consume roughly 15 mW of power per active voice channel. In contrast, an implementation of the voice processor feature set based on general purpose DSPs and supporting circuitry would consume at least 35 mW per active channel. The following discussion presents an overview of the basic architecture and major functional components of the voice processor. A detailed description is then provided of some of its novel features and modes of operation.

Figure 3:
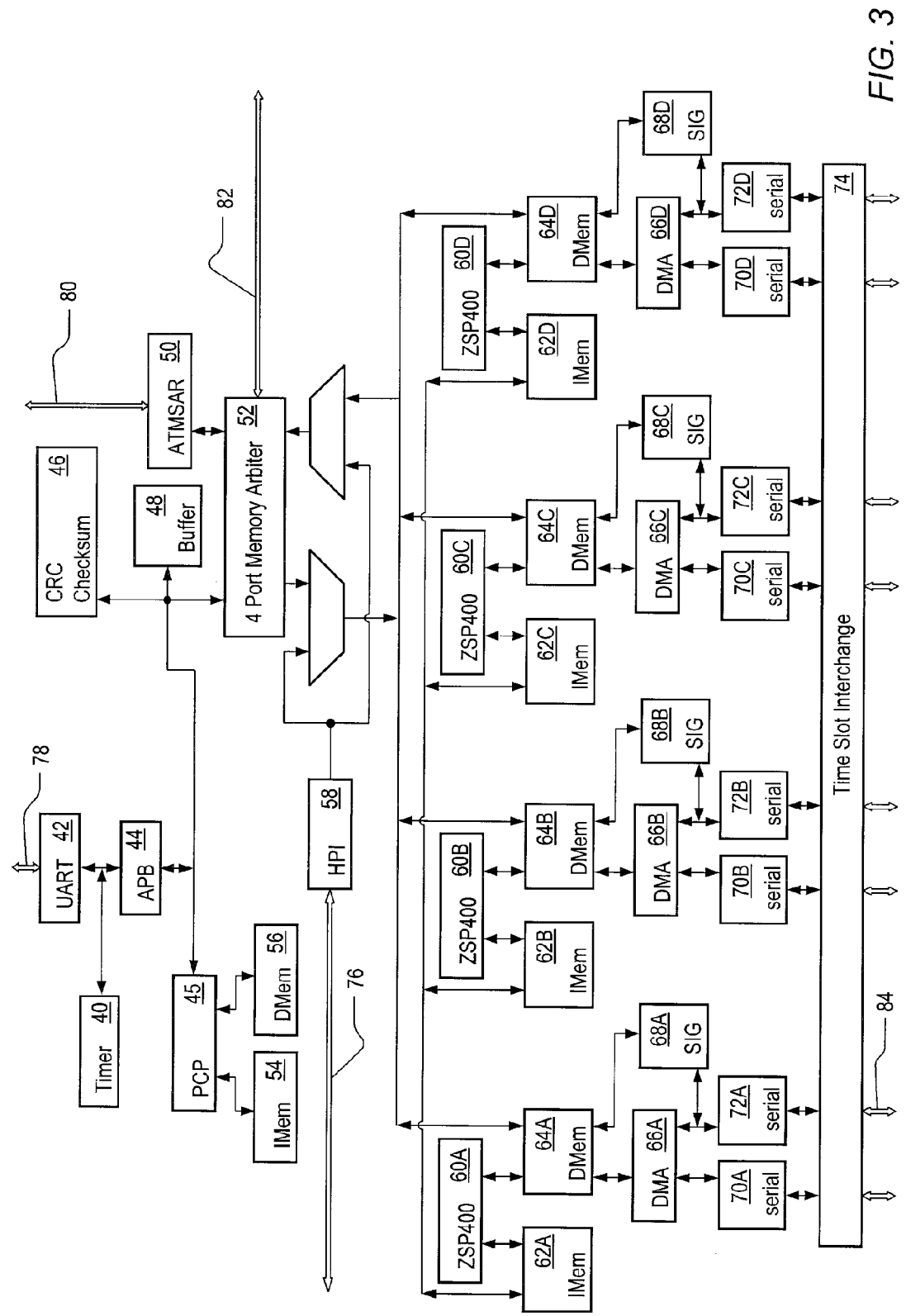
FIG. 3 contains a block diagram of an embodiment of a voice processor.

FIG. 3 contains a block diagram of an embodiment of the voice processor. The major components and signal paths within the processor are shown in FIG. 3, all of which can be present on a single monolithic semiconductor substrate. Signals to/from the outside (i.e., outside the processor) are represented as broad arrows. The processor has two major signal input/output paths. The first is a set of 8 bi-directional serial data connections 84, over which frame-based data is exchanged between the processor and a TDM port, such as a T1 backplane. The second is the ATMSAR port 80, over which packetized or cell-based data is exchanged between the processor and a connectionless network, such as Ethernet. In addition, a host processor interface (HPI) 58 allows control of the voice processor's internal functions by an external host processor connected to host processor bus 76, and an external memory interface 82 allows the use of supplemental off-chip memory.

In the present embodiment, the voice processor contains four digital signal processors (DSPs), 60A-D, which operate independently of one another. Based on the popular "Harvard" architecture, each of these processors has its own 64K× 16-bit program instruction memory space (62A-D) and 48K× 16-bit data memory space (64A-D). The voice processor contains 8 external serial ports 84 through which it can receive and transmit TDM-format data (e.g., from a framer). The serial ports are bi-directional and (in each direction) comprise three signals—data, sync and clock. Data to/from the external serial ports passes through a time slot interchange (TSI) circuit 74. Each of the DSPs 60A-D are provided with a pair of internal serial ports 70A-D and 72A-D, through which the DSPs interface to the TSI 74. Serial port associations for incoming and outgoing TDM data can be dynamically reassigned by the TSI circuit 74 (as discussed in detail below). The voice processor supports both voice band and clear channel telephony signaling, through the provision of a telephony signaling circuit 68A-D (discussed in detail below) coupled to one of the two serial ports 72A-D associated with each of the DSPs. The data memory 64A-D associated with the DSPs 60A-D is accessible by both the DSP and the associated dynamic memory access (DMA) controller 66A-D, and can service two or more read or write requests simultaneously. To accomplish this, each of the data memories 64A-64D is segmented. A segmented memory space is subdivided into quasi-independent sections. As long as simultaneous memory accesses are not made to the same segment (referred to as a collision), the memory can be shared without performance degradation due to contention. This capability is exploited in the voice processor to enhance data throughput. For example, both internal serial ports 70A-D and 72A-D associated with each DSP 60A-D use the respective DMA controller 66A-D to directly access the data memory of the DSP. This is much faster than if it were necessary to invoke the DSP itself to move data between the serial port and memory. Special circuitry within the serial ports applies μ-law dynamic range compression and expansion on incoming and outgoing voice data, avoiding the need for the DSP to expend processor cycles performing this operation.

A packet control processor (PCP) 45 is also included in the present embodiment of the voice processor. This device is a general purpose microprocessor with a reduced instruction set computer (RISC) architecture, and can be based on the ARM922 microprocessor. Supporting the PCP 45, can be a 32K×32-bit buffer memory 48, a 4-port memory arbiter 52 and a (cyclic redundancy check) CRC checksum engine 46. The PCP also has its own 2K×32-bit instruction memory 54 and 2K×32-bit data memory 56. An ARM peripheral bus (APB) controller 44 interfaces the PCP 45 to low-speed peripheral devices, such as a set of 8 16-bit timers 40 and a universal asynchronous receiver and transmitter (UART) 42. The UART 42 allows an external terminal or computer to interact with the PCP over serial bus 78, and would typically be used for debugging or code development. The PCP 45 serves a number of functions in the voice processor. One of the principal responsibilities of the PCP is the management of a protocol stack for packetized data. As described earlier, data packets contain a header compounded from information associated with the protocols at different OSI layers. When data received through the external serial ports 84 is prepared for transmission out of ATMSAR port 80 onto a network, the data must be reorganized as packets or cells, and the appropriate header attached to each packet or cell. The PCP 45 builds this header, according to the selected output data format, and prefixes it to outgoing packets or cells. This process is reversed when packetized data received into ATMSAR port 80 is transmitted in frame-based format to a TDM port, using external serial ports 84. The PCP 45 then strips the headers from the incoming data and reorganizes the data as frames, before transmitting it out the external serial ports 84. ATMSAR 50 may be configured to either directly send/receive packetized data over ATMSAR port 80, or first subdivide/reconstruct the data into/from ATM cells.

The PCP also coordinates the operation of the DMA controllers 66A-D and 4-port memory arbiter 52 to manage the transfer of data between the DSPs and the ATMSAR. Incoming data is thus properly allotted to the DSP segmented data memory 64A-D, allowing the processing of this data to be shared among the DSPs 60A-D, thereby optimizing data throughput. Furthermore, the PCP performs error detection and overall management functions in the absence of an external host processor.

As discussed previously, a time slot interchange (TSI) circuit reroutes data by rearranging the time slots between incoming and outgoing channels. In the general case, a minimum of 256 bytes of memory is required to buffer both the incoming frame and the outgoing frame (with the modified channel assignments). A novel TSI design is adopted in the voice processor, which obviates the need for such large buffers. In voice processing applications for which the voice processor is intended, incoming TDM data is typically received from a framer or similar device. This implies that the data streams will already have been synchronized to a common clock rate, eliminating the need for the TSI in the voice processor to buffer and synchronize an entire incoming frame of data before rearranging the time slots.

Figure 4:
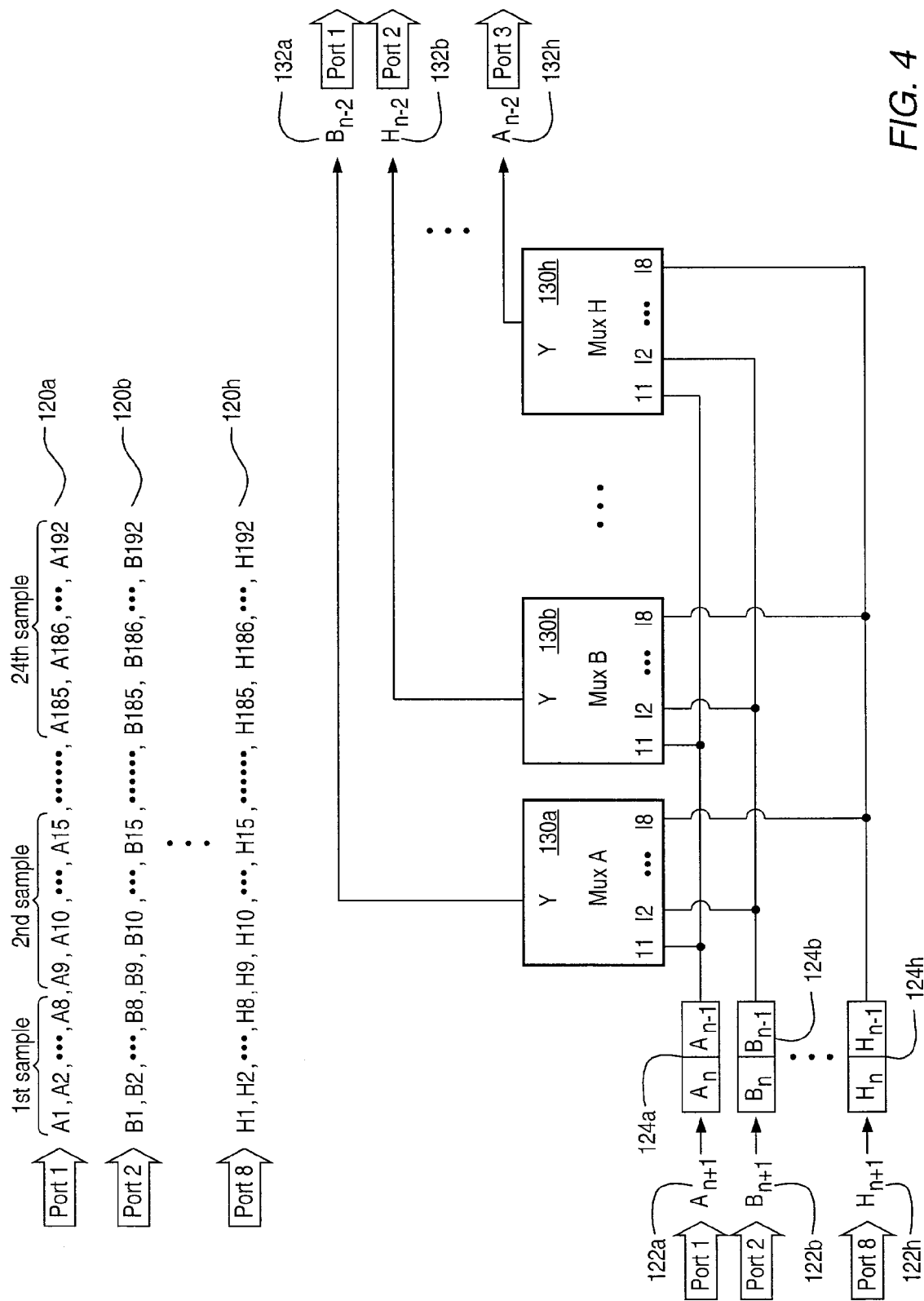
FIG. 4 illustrates the operation of the time slot interchange (TSI) circuit employed in an embodiment of the voice processor.

FIG. 4 illustrates the operation of an embodiment of the simplified TSI employed in the voice processor. In FIG. 4, each of the 8 voice processor serial ports (items 70A-D and 72A-D in FIG. 3) receives a TDM data stream 120*a-h*, consisting of 192 bits of serial data at a rate of 1.544 Mbps. The bit stream on each of the 8 input ports represents a sequence of 8-bit voice data samples, each of which corresponds to a time slot. Thus, for example, bits A1-A8 represent the first time slot in the TDM data stream 120*a* into port 1, while bits B8-B16 represent the second time slot in the TDM stream 120*b* into port 2. Eight 2-bit buffers 124*a-h* (one for each of the serial ports 70A-D and 72A-D shown in FIG. 3) are used to interchange the time slots, representing a total of only 16 bits of storage. Each buffer functions like a shift register. Synchronous with each data clock, an incoming bit 122*a-h* from the corresponding incoming TDM data stream is placed in the first location of the buffer, while the bit previously held in the first location is shifted into the second location. Eight 8-input multiplexers 130*a-h* reassign incoming data bits to outgoing data streams. Each multiplexer is associated with one of the outgoing TDM lines 132*a-h*, and is capable of taking a data bit from the buffer corresponding to a given incoming data stream and placing it in its associated output data stream. For example, Mux B 130*b* may select a bit from buffer 124*h* and place it into outgoing data stream 132*b*. As the 2-bit buffers advance the data from the first to the second location, the bit selected by each multiplexer is clocked into the respective outgoing data stream. For example, as the n+1$^{th}$ bit in the data stream incoming through port 2, $B_{n+1}$ 122*b*, is clocked into the first stage of buffer 124*b*, bit $B_n$ moves from the first stage to the second stage of the buffer. At the same time, bit $B_{n-1}$ is clocked into one of the outgoing data streams 132*a-h*, depending on which of the multiplexers Mux A 130*a*-Mux H 130*h* has selected buffer 124*b*.

Time slots are interchanged by using the multiplexers as described above to transpose all 8 bits of an incoming sample (i.e., a time slot) to a prescribed outgoing data stream. In the example shown in FIG. 4, bits arriving in the data stream received at port 2 are placed in the data stream sent out over port 1. As a result of this reassignment, over the course of 8 consecutive 125 μs intervals an entire sample received at the input of port 2 will appear at the output of port 1, while the sample received at the input of port 8 will appear at the output of port 2, etc.

The movement of incoming data from the serial ports into the buffer must be fast enough to keep up with the incoming data rate. Advantageously, the TSI circuit and method disclosed herein are suitable for operation at very high speeds. The present embodiment of the TSI will support data rates on the TDM ports of 128 channels at 8 Mbps.

Note that simplified examples have been used to illustrate the operation of the TSI circuitry apart from other components of the voice processor. In practice, incoming TDM voice data is not simply rerouted, but typically undergoes processing in the DSPs 60A-D. In this case, the TSI may be used to reassign time slots to different DSPs. This may be done to dynamically balance the workload of the DSPs. It was stated above that the simplification of the TSI is founded on the assumption that data arriving at all 8 serial ports is synchronous. However, a transparent mode of operation is also available in the TSI to support independently clocked data streams. In transparent mode, the clock data and sync line of each external serial port is directly connected to the corresponding lines of the internal serial ports. This is in contrast with the normal synchronous mode, in which the clock and sync signals of serial port 0 provide the timing for all 8 ports.

The transfer of frame-based data into or out of the DSP data memory is facilitated by the use of indexed DMA controllers, which target prescribed regions within the DSP data memory. As mentioned above, the DSP data memory supports multi-port access, so reads and writes can occur to two non-overlapping segments simultaneously. Collisions are avoided through the use of a linked list of buffer management descriptors (BMDs). Each BMD is a data structure containing the location and size of a buffer region, a flag indicating whether the region is vacant, and a pointer to the next BMD in the list. Since the last BMD in the list points to the first, the DMA buffer regions are organized as a ring. The indexed DMA controller contains a pointer to the next available BMD (i.e., the next BMD in the ring whose buffer region does not contain valid data). Also included within the BMD are CRC and checksum values, used for error checking. The size, number, etc. of the BMDs and their corresponding buffer regions are defined by the PCP.

When incoming frame-based data is received (over serial ports 70A-D and 72A-D in FIG. 3), each channel is assigned a DSP and a BMD pointer mapping the data to a particular buffer region in the DSP data memory (items 64A-D in FIG. 3). When data is placed into a buffer area, the flag in the corresponding BMD is set to indicate that the buffer contains valid data. Signal processing operations, such as echo canceling, are then performed by the DSP on each channel of data within the respective buffer regions. If the processed data is to be output onto a network, it must be appropriately formatted. This requires the data to be organized as packets or ATM cells, with headers corresponding to the network protocol stack. Much of this functionality is implemented in the PCP (item 45 in FIG. 3).

In the present embodiment of the voice processor, the PCP is a 200 MHZ 32-bit RISC-type processor, which has DMA access to the data memory of each DSP. To prepare processed data for export on a network, the data is first transferred from the DSP memory to the 32K×32-bit buffer memory (item 48 in FIG. 3). Note that since this is a DMA transfer from a multi-port memory, DSP execution is not impeded. Within the PCP buffer memory, the data is reorganized as variable length packets and a sequence of encapsulation steps carried out, in which headers for the various levels of the operative protocol stack are added to each packet. Thus, a complete packet consists of a header portion and the transmitted data itself (often referred to as the "payload"). As the composite header is constructed, the CRC/Checksum engine (item 46 in FIG. 3) computes cyclic redundancy and checksum values, which will be used to verify the integrity of the transmitted data.

For example, packets may be prepared for transmission over a Synchronous Optical NETwork (SONET). The SONET standard for digital optical transmission was introduced in the late 1980's to provide a means for digitally encoding voice, video and other information for transmission over optical fiber. In this case, the interface to the network over which the data may be transmitted is a "Packet Over a SONET-Physical Layer Interface" (POSPHY), and the data packets require a composite header containing RTP/UDP/IP protocol layers.

In the present embodiment of the voice processor, the composite packet header is constructed in a highly efficient manner through the use of fixed header templates. Rather than compute entire packet headers "from scratch", a header template is prepared in advance for each active data channel, based on the particular protocol stack, and placed in a prescribed location within the 32K×32-bit PCP buffer memory. Conveniently, the basic structure of the header will not change from one packet to another, and only certain fields (e.g., packet length, checksum, etc.) within the header will need to be modified. These variable fields are updated by the PCP as it assembles the payload for each packet from DSP-processed data. A complete packet is then formed by prefixing the pre-computed header to its respective payload. To accomplish this without moving the payload or the header, a pointer containing the location of the payload is attached to the header. When the PCP transmits the packet, its indexed DMA controller accesses both the header and payload from the buffer memory with no intervention by the PCP itself.

Packetized data is presented by the ATMSAR (item 50 in FIG. 3) over the ATMSAR port (item 80 in FIG. 3), with the ATMSAR operating in transparent mode. Normally, the ATMSAR divides the packetized data from the PCP into ATM cells, before transmitting it over a network based on the "Universal Test and Operation Physical Interface for ATM" (UTOPIA) standard. In transparent mode, however, the ATMSAR outputs the packetized data without modification.

Packet-based or cell-based data may also be received by the voice processor over the ATMSAR port. In this case, the previously described sequence of events is reversed. Incoming ATM cells are disassembled by the ATMSAR, with the header information being used to assign payload data to TDM channels. After the CRC/Checksum engine verifies cyclic redundancy and checksum values on the incoming data, the PCP moves the data into the memory of the appropriate DSP and initializes the BMD pointer, flags, etc. to enable fast DMA access of the data by the DSP. Following signal processing operations performed on the data by the DSP, the associated serial ports transmit frame-based TDM data, using the associated DMA controller to efficiently transfer the data from memory. The same procedure is followed in the case of packet-based data, except that the ATMSAR operates transparently and merely forwards the packets to the PCP.

Figure 5:
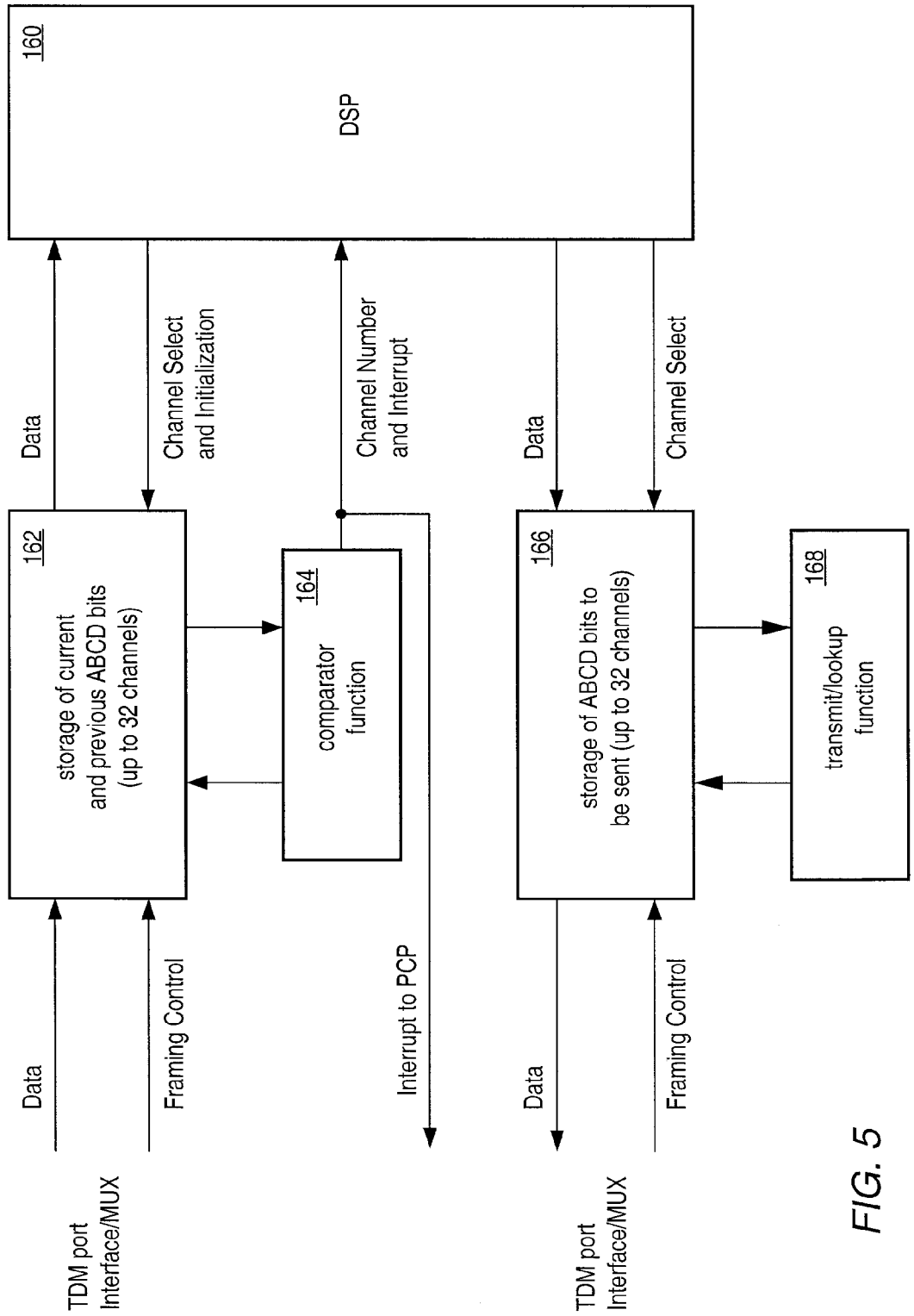
FIG. 5 illustrates operation of the telephony signaling circuit employed in an embodiment of the voice processor.

In the present embodiment of the voice processor, a telephony signaling circuit is present in one of the two serial ports associated with each of the DSPs. This circuit, described in detail below, imposes a very small computational burden on the respective DSP and is another novel feature of the present invention. The telephony signaling components corresponding to one DSP are shown in FIG. 5. These components consist of the DSP itself 160, two storage registers 162 and 166, a comparator 164 and data selector/transmitter 168. Note that, except for the DSP, all of these components can be created using a small number of standard logic elements, such as flip-flops and gates.

As explained earlier, the "robbed bit" technique for telephony signaling inserts signal bits in 2 frames of a superframe, or 4 frames of an extended superframe of TDM data, by overwriting (the least significant bit of) voice data in those frames. The telephony signaling bits indicate line status and typically change very relatively infrequently. Nevertheless, it is important to monitor the state of these bits from one frame (or superframe) to the next. It would be inefficient to require the DSP to regularly test the signaling bits, since this would divert it from its critical signal processing activities. Instead, the circuitry shown in FIG. 5 performs this function, and involves the DSP only when necessary. Incoming TDM data is received by storage register 162, which saves the current and previous states of the ABCD signal bits for up to 32 channels. The comparator 164 compares the current and previous signal bit states and interrupts the DSP 160 only when there has been a change. Since a change in the signal bit state represents a change in the status of the line, the DSP may then take some action in response. For example, if the signal bits indicate an "on-hook" condition (meaning that the call has terminated), the DSP would cease processing data for that channel. Advantageously, the DSP is not diverted from its other activities unless there is actually a change in the line status.

The DSP can also control the state of the telephony signaling bits in outgoing voice data by writing the bit values for a prescribed channel to storage register 166. This need only be done once. Afterwards, the data selector/transmitter 168 will automatically insert the bit pattern into the voice data for the specified channel in all subsequent frames, until otherwise directed by the DSP. In an alternate mode of operation, telephony signaling is managed by the PCP, rather than the individual DSPs. In this mode, the PCP receives notification from the comparison registers of changes in the line status, and also signals line status changes using the modification registers.

It will be appreciated by those skilled in the art having the benefit of this disclosure that this invention is believed to present a system and method for saving and restoring the state of a diagnostic module. Further modifications and alternative embodiments of various aspects of the invention will be apparent to those skilled in the art in view of this description. Details described herein, such as the number of DSPs, serial ports, etc., are exemplary of a particular embodiment. It is intended that the following claims be interpreted to embrace all such modifications and changes and, accordingly, the specification and drawings are to be regarded in an illustrative rather than a restrictive sense.

The invention claimed is:

1. A method for redistributing bits arriving in an input data stream into a corresponding output data stream, comprising the steps of:
    (A) receiving a sequence of data bits in said input data stream, wherein said data bits are arranged in a plurality of frames;
    (B) storing a plurality of first subsequences of said data bits in an input circuit, wherein each one of said first subsequences corresponds to a different one of said frames;
    (C) comparing said first subsequence in a current one of said frames with said first subsequence in a previous one of said frames; and
    (D) interrupting a processor in response to a mismatch detected by said comparing;
    (E) transferring a second subsequence from said processor to an output circuit;

(F) replacing said first subsequence in said current frame with said second subsequence; and (G) transmitting said current frame with said second subsequence in said output data stream from said output circuit.

2. The method according to claim 1, wherein (i) said input data stream comprises a plurality of channels and (ii) said comparing comprises a plurality of intra-channel comparisons.

3. The method according to claim 2, further comprising the step of:

notifying said processor of a channel number corresponding to each of said channels in which a mismatch is detected between said first subsequences in two of said frames.

4. The method according to claim 1, wherein said input data stream comprises a plurality of channels, the method further comprising the step of:

extracting said current frame from a selected one of said channels, wherein said selected channel is determined by said processor.

5. The method according to claim 4, further comprising the step of:

transferring said current frame from said input circuit to said processor after said extraction.

6. An apparatus comprising:

an input circuit configured to (i) receive a sequence of data bits in an input data stream and (ii) store a plurality of first subsequences of said data bits, wherein (a) said data bits are arranged in a plurality of frames and (b) each one of said first subsequences corresponds to a different one of said frames;

a comparator configured to compare said first subsequence in a current one of said frames with said first subsequence in a previous one of said frames;

a processor configured to transfer a second subsequence to an output circuit, wherein said comparator is further configured to interrupt said processor in response to a mismatch detected by said compare; and an intermediate circuit configured to (i) receive said second subsequence and said current frame from said output circuit, (ii) replace said first subsequence in said current frame with said second subsequence (iii) and transfer said current frame to said output circuit, wherein said output circuit is configured to transmit said current frame with said second subsequence in an output data stream.

7. The apparatus according to claim 6, wherein (i) said input data stream comprises a plurality of channels and (ii) said compare comprises a plurality of intra-channel comparisons.

8. The apparatus according to claim 7, wherein said comparator is further configured to notify said processor of a channel number corresponding to each of said channels in which a mismatch is detected between said first subsequences in two of said frames.

9. The apparatus according to claim 6, wherein (i) said input data stream comprises a plurality of channels, (ii) said input circuit is further configured to extract said current frame from a selected one of said channels and (iii) said selected channel is determined by said processor.

10. The apparatus according to claim 9, wherein said input circuit is further configured to transfer said current frame to said processor after said extraction.

11. An apparatus comprising:

a time-slot interchange circuit configured to (i) rearrange a plurality of time slots between a plurality of data frames and (ii) send said data frames to a plurality of processors, wherein said processors are configured to (i) operate on digitized voice data in said data frames and (ii) send said data frames to a buffer after said operation;

a plurality of memory circuits connected between said processors and said time-slot interchange circuit; and a packet control processor configured to (i) read said data frames from said buffer and (ii) convert said data frames into a cell-based data format.

12. The apparatus according to claim 11, further comprising a reassembly circuit configured to (i) segment said cell-based data format and (ii) reconstruct said digitized voice data from said cell-based data format.

13. The apparatus according to claim 11, further comprising an interface circuit configured to (i) communicate with said processors and (ii) communicate with an external processor outside of said apparatus.

14. The apparatus according to claim 11, further comprising a plurality of signaling circuits in communication with said processors, wherein each of said signaling circuits is configured to perform (i) voice band signaling in a first mode and (ii) clear channel signaling in a second mode.

15. The apparatus according to claim 11, wherein each of said memory circuits is (i) multi-ported and (ii) divided into plurality of sections such that said memory circuits communicate with a corresponding one of said processors and said time-slot interchange circuit in parallel.

16. The apparatus according to claim 11, wherein said processors, said time-slot interchange circuit and said packet control processor are all integrated upon a single semiconductor substrate.

* * * * *